US012352401B2

(12) United States Patent
Hessling von Heimendahl et al.

(10) Patent No.: US 12,352,401 B2
(45) Date of Patent: Jul. 8, 2025

(54) AIRCRAFT HEADLIGHT, AIRCRAFT COMPRISING AN AIRCRAFT HEADLIGHT AND METHOD OF MANUFACTURING AN AIRCRAFT HEADLIGHT

(71) Applicant: Goodrich Lighting Systems GmbH & Co. KG, Lippstadt (DE)

(72) Inventors: Andre Hessling von Heimendahl, Koblenz (DE); Marion Depta, Lippstadt (DE); Anil Kumar Jha, Lippstadt (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/407,227

(22) Filed: Jan. 8, 2024

(65) Prior Publication Data
US 2024/0240769 A1 Jul. 18, 2024

(30) Foreign Application Priority Data
Jan. 17, 2023 (EP) ..................................... 23152105

(51) Int. Cl.
*F21S 41/32* (2018.01)
*F21S 41/43* (2018.01)
*F21W 107/30* (2018.01)
(52) U.S. Cl.
CPC ............. *F21S 41/321* (2018.01); *F21S 41/43* (2018.01); *F21W 2107/30* (2018.01)

(58) Field of Classification Search
CPC ........ F21S 41/148; F21S 41/321; F21S 41/43; F21S 43/14; F21S 43/30; F21S 43/31; F21S 43/315; F21S 43/33; F21S 43/40; F21S 45/50
See application file for complete search history.

(56) References Cited

U.S. PATENT DOCUMENTS

| | | | | | |
|---|---|---|---|---|---|
| 2,629,815 | A | * | 2/1953 | Wheeler | F21S 45/50 362/310 |
| 3,309,554 | A | * | 3/1967 | De Lorenzo | F21S 41/28 362/296.07 |
| 3,629,815 | A | * | 12/1971 | Hattwig | B60Q 1/444 340/463 |

(Continued)

FOREIGN PATENT DOCUMENTS

| | | |
|---|---|---|
| CN | 214745465 | 11/2021 |
| EP | 2315494 | 4/2011 |

(Continued)

OTHER PUBLICATIONS

European Patent Office; European Search Report filed Jun. 27, 2023 in Application No. 23152105.5.

*Primary Examiner* — Matthew J. Peerce
(74) *Attorney, Agent, or Firm* — SNELL & WILMER L.L.P.

(57) ABSTRACT

An aircraft headlight comprises at least one light source and an integrated, single-piece optical structure. The integrated, single-piece optical structure includes a light transmissive protective cover portion, forming an outer light emission surface of the aircraft headlight, and at least one reflector portion, arranged for directing light that is emitted by the at least one light source through the light transmissive protective cover portion.

10 Claims, 7 Drawing Sheets

(56) References Cited

U.S. PATENT DOCUMENTS

| | | | | |
|---|---|---|---|---|
| 6,097,549 A | * | 8/2000 | Jenkins | F21S 43/14 |
| | | | | 362/520 |
| 6,439,752 B1 | * | 8/2002 | Petrick | F21V 23/02 |
| | | | | 362/470 |
| 7,513,665 B2 | * | 4/2009 | Chinniah | F21S 41/322 |
| | | | | 362/328 |
| 7,635,206 B2 | * | 12/2009 | Huang | F21V 29/76 |
| | | | | 362/249.02 |
| 8,596,841 B2 | * | 12/2013 | Yagi | F21S 41/143 |
| | | | | 362/519 |
| 10,788,189 B2 | * | 9/2020 | Yang | G02B 5/0252 |
| 2009/0310356 A1 | | 12/2009 | Laporte | |
| 2014/0268811 A1 | * | 9/2014 | Chen | F21V 5/04 |
| | | | | 362/311.01 |
| 2018/0087751 A1 | | 3/2018 | Jung et al. | |
| 2024/0210026 A1 | * | 6/2024 | Eom | F21S 43/31 |

FOREIGN PATENT DOCUMENTS

| | | |
|---|---|---|
| EP | 2886941 | 6/2015 |
| EP | 3205584 | 8/2017 |

* cited by examiner

AIRCRAFT HEADLIGHT, AIRCRAFT COMPRISING AN AIRCRAFT HEADLIGHT AND METHOD OF MANUFACTURING AN AIRCRAFT HEADLIGHT

CROSS-REFERENCE TO RELATED APPLICATIONS

This application claims priority to, and the benefit of, EP patent application Ser. No. 23/152,105.5, filed Jan. 17, 2023 and titled "AIRCRAFT HEADLIGHT, AIRCRAFT COMPRISING AN AIRCRAFT HEADLIGHT AND METHOD OF MANUFACTURING AN AIRCRAFT HEADLIGHT," which is incorporated by reference herein in its entirety for all purposes.

FIELD

The present invention is in the field of exterior aircraft lights, in particular aircraft headlights. The present invention also includes aircraft comprising at least one aircraft headlight and a method of assembling an aircraft headlight.

BACKGROUND

Almost all aircraft are equipped with aircraft lights, including exterior aircraft lights, which are installed on the outside of the aircraft, and interior aircraft lights, which are installed within the aircraft. Exterior aircraft lights in particular include aircraft headlights, such as take-off lights, landing lights, taxi lights, runway turn-off lights. Exterior aircraft lights may also include navigation lights, white strobe anti-collision lights, red flashing beacon lights, logo lights, cargo loading lights, wing scan lights, engine scan lights, search lights, etc.

In many cases, aircraft headlights need to be installed in an exposed location, for example at the landing gear/running gear of the aircraft, as they do not fit into the wings of the aircraft. Aircraft headlights, which are installed in an exposed location such as the landing gear/running gear, are exposed to strong air streams, when the aircraft is in flight. This may result in large mechanical stresses, acting onto the aircraft headlights, and in an undesirable high aerodynamic drag, caused by the aircraft headlights.

Accordingly, it would be beneficial to provide compact aircraft headlights that may be installed in the wings, in particular in the leading edges and/or in the wing roots, of aircraft and/or that may cause reduced aerodynamic drag, when mounted to the landing gear/running gear of aircraft.

SUMMARY

Exemplary embodiments of the invention include an aircraft headlight comprising at least one light source and an integrated, single-piece optical structure. The integrated, single-piece optical structure includes a light transmissive protective cover portion, forming an outer light emission surface of the aircraft headlight; and at least one reflector portion, which is arranged and configured/shaped for directing light that is emitted by the at least one light source through the light transmissive protective cover portion.

Exemplary embodiments of the invention also include an aircraft, such as an airplane or a rotorcraft, comprising at least one aircraft headlight according to an exemplary embodiment of the invention. The at least one aircraft headlight may in particular be installed in a wing, in particular in a leading edge of a wing and/or in a wing root, of the aircraft. It is also possible that the at least one aircraft headlight is installed on a landing gear/running gear of the aircraft. It is further possible that one or more aircraft headlights are installed in the wing and one or more aircraft headlights are installed on the landing gear/running gear. One or some or all of the aircraft headlights may be implemented in accordance with exemplary embodiments of the invention.

Exemplary embodiments of the invention further include a method of manufacturing an aircraft headlight, wherein the method comprises: forming an integrated, single-piece optical structure, wherein the integrated, single-piece optical structure includes a light transmissive protective cover portion and at least one reflector portion; arranging at least one light source at at least one predefined position with respect to the integrated, single-piece optical structure, such that the at least one reflector portion directs light emitted by the at least one light source through the light transmissive protective cover portion; and arranging the integrated, single-piece optical structure in the aircraft headlight such that the light transmissive protective cover portion forms an outer light emission surface of the aircraft headlight.

Integrating the light transmissive protective cover portion and the at least one reflector portion into a single-piece optical structure in accordance with exemplary embodiments of the invention allows for a space saving, compact structure of the aircraft headlight. In particular, said integration may allow for forming the aircraft headlight with a space saving front surface, which does not have to extend beyond the light emission surface provided by light transmissive protective cover portion.

Exemplary embodiments of the invention may allow for the provision of aircraft headlights that do not have a peripheral retainer for holding the protective cover in place. By dispensing with the peripheral retainer, a significant reduction of the total frontal area of the aircraft headlight may be achieved.

An aircraft headlight according to an exemplary embodiment of the invention may be installed within a wing, on particular in a leading edge and/or in a wing root of an aircraft wing. When installed within a wing of the aircraft, the aircraft headlight is not exposed to large mechanical stresses, and it does not add to the aerodynamic drag of the aircraft. When installed on a landing gear/running gear of the aircraft, the aircraft headlight according to exemplary embodiments of the invention may cause less aerodynamic drag than the aircraft headlights of previous approaches.

According to an embodiment, the aircraft headlight further comprises a housing accommodating the at least one light source, and the integrated, single-piece optical structure cooperates with said housing. In particular, the integrated, single-piece optical structure may engage with said housing for forming the outer structure of the aircraft headlight.

According to an embodiment, the method of manufacturing an aircraft headlight includes arranging the at least one light source in a housing and arranging the integrated, single-piece optical structure to cooperate/engage with said housing for forming the outer structure of the aircraft headlight.

The light transmissive protective cover portion of the integrated, single-piece optical structure may be seen as constituting a light emission surface of the housing. The light transmissive protective cover portion may in particular constitute a complete outer surface at at least one side of the housing.

According to an embodiment, the integrated, single-piece optical structure closes said housing at least on one side thereof. Such a configuration may allow for a particularly compact and space saving structure of the aircraft headlight.

According to an embodiment, the at least one reflector portion of the integrated, single-piece optical structure protrudes into an inner space of the housing. In particular, the at least one reflector portion may be arranged in the protected inner space, formed by the housing and by the light transmissive protective cover portion. Further, the integrated, single-piece optical structure may act both as part of the outer structure and as a support structure for the at least one reflector portion. By fixing the integrated, single-piece optical structure in position with respect to the housing, it may be possible to not require further positioning means/attachment means for the at least one reflector portion.

According to an embodiment, the integrated, single-piece optical structure has a u-shape or a v-shape in at least one cross-section, with the light transmissive protective cover portion forming a first leg and the at least one reflector portion forming a second leg of the u-shape or the v-shape. A structure having a u-shape or a v-shape in at least one cross-section has been found as providing a space saving integrated, single-piece optical structure, while being well suited for generating a desired light output of the aircraft headlight.

According to an embodiment, the light transmissive protective cover portion has a substantially rectangular shape. The substantially rectangular shape may comprise rounded edges and/or corners, in order to avoid sharp outer edges. An aircraft headlight including a light transmissive protective cover portion having a substantially rectangular shape is well suited for being installed in a wing of an aircraft, in particular in a leading edge of a wing and/or in a wing root of an aircraft.

According to an embodiment, the substantially rectangular shape has a lateral extension of between 40 mm and 150 mm, more in particular a lateral extension of between 80 mm and 120 mm. According to an embodiment, the substantially rectangular shape has a height extension of between 20 mm and 50 mm, more in particular a height extension of between 25 mm and 40 mm. Aircraft headlights including a light transmissive protective cover portion having these dimensions have been found as being particularly well suited for being installed in a wing, in particular in a leading edge and/or in a wing root, of an aircraft.

According to an embodiment, a reflective coating, in particular a metallic reflective coating, is provided at the at least one reflector portion. The reflective coating/metallic reflective coating may cover the at least one reflector portion completely or partially. The light transmissive protective cover portion and the at least one reflector portion may be made from the same material, in particular from a light transmissive material, further in particular from a transparent material. At least a portion of the material forming the at least one reflector portion may then be covered with a reflective coating, in particular a metallic reflective coating, for providing the desired light reflecting properties of the at least one reflector portion.

According to an embodiment, the method of manufacturing an aircraft headlight includes applying a reflective coating, in particular a metallic reflective coating, to the at least one reflector portion. The reflective coating may in particular be applied by evaporation deposition. Forming the light transmissive protective cover portion and the at least one reflector portion from the same light transmissive material and applying a reflective coating to the at least one reflector portion may enable a particularly efficient production of the integrated, single-piece optical structure. Evaporation deposition provides a very efficient method for applying a reflective coating to the at least one reflector portion.

According to an embodiment, the integrated, single-piece optical structure is made from a polymer based material. The integrated, single-piece optical structure may in particular be made from a polycarbonate based material. Polymer based materials, in particular polycarbonate based materials, have been found as well suited for forming integrated, single-piece optical structures having a high durability, a low weight and good light transmissive properties. Other polymer base materials, such as PMMA, are suitable as well.

According to an embodiment, the light transmissive protective cover portion is transparent. While the light transmissive protective cover portion is described as light transmissive/transparent, it does not have to be light transmissive/transparent over its full extension. It is possible that the light transmissive protective cover portion is light transmissive/transparent over a large portion thereof and has minor portions that are not light transmissive/transparent. In such a scenario, the light transmissive protective cover portion is still considered light transmissive.

According to an embodiment, the step of forming the integrated, single-piece optical structure includes forming the integrated, single-piece optical structure by molding, in particular by injection molding. According to an embodiment, the integrated, single-piece optical structure is a molded structure, in particular an injection-molded structure. Molding, in particular injection-molding, has been found as a well-suited and cost efficient method for forming the integrated, single-piece optical structure.

According to an embodiment, the at least one reflector portion has an at least partially spherical shape or an at least partially parabolic shape. Reflector portions, which are at least partially shaped to have a spherical shape or a parabolic shape, are well suited for providing a desired light output of the aircraft headlight, in particular for forming a high intensity light beam that is output by the aircraft headlight in a desired direction/in desired directions.

According to an embodiment, the aircraft headlight comprises a support structure for supporting the at least one light source, in particular for supporting the at least one light source in a predefined position with respect to the at least one reflector portion for generating a desired light output. The support structure may be mounted to the housing.

According to an embodiment, the support structure includes a circuit board, in particular a printed circuit board comprising electric paths for supplying electric energy to the at least one light source. A circuit board, in particular a printed circuit board, may provide an efficient structure for supporting the at least one light source and supplying the electric power that is needed for operating the at least one light source.

An aircraft headlight according to an exemplary embodiment of the invention may be a landing light, a take-off light, a taxi light, a runway turn-off light, or a multi-functional light, which combines the functionalities of any two or any three or all of a landing light, a take-off light, a taxi light, and a runway turn-off light.

According to an embodiment, the at least one light source comprises a plurality of light sources, and the at least one reflector portion comprises a plurality of reflector portions. Each of the plurality of reflector portions may be associated with one or more of the plurality of light sources. Each of the plurality of reflector portions may be arranged and configured for directing light that is emitted by said one or more associated light sources through the light transmissive protective cover portion for providing a desired light output of the aircraft headlight.

Providing a plurality of light sources and simultaneously operating said plurality of light sources may allow for enhancing the intensity of light emitted by the aircraft headlight.

Providing a plurality of reflector portions, which may be shaped and/or oriented differently, may allow for simultaneously emitting different light outputs, in particular different light beams, from the same aircraft headlight and/or for emitting different light outputs, in particular different light beams, at different points in time, e.g. in different operating situations of the aircraft.

According to an embodiment, the plurality of light sources may comprise at least two sets of light sources that are switchable independently of each other. Each set of light sources may comprise one or more light sources. An aircraft headlight comprising at least two sets of light sources may allow for changing the light output of the aircraft headlight by selectively activating one or more of the at least two sets of light sources.

According to an embodiment, a first set of light sources may for example, be provided to generate a landing light beam, and a second set of light sources may for example, be provided to generate a take-off light beam. By selectively activating the first set of light sources or the second set of light sources, the aircraft headlight may be selectively operated as a landing light or as a take-off light.

According to an embodiment, a first set of light sources may for example, be provided to generate a landing light beam, and a second set of light sources may for example, be provided to generate a taxi light beam. Be selectively activating the first set of light sources or the second set of light sources, the aircraft headlight may be selectively operated as a landing light or as a taxi light.

According to an embodiment, a first set of light sources may for example, be provided to generate a taxi light beam, and the second set of light sources may for example, be provided to generate a runway turn-off light beam. Be selectively activating the first set of light sources and/or the second set of light sources, the aircraft headlight may be selectively operated as a taxi light and/or as a runway turn-off light.

BRIEF DESCRIPTION OF THE DRAWINGS

Further embodiments of the invention will be described in the following with respect to the accompanying drawings, wherein.

DETAILED DESCRIPTION

Figure 1A:
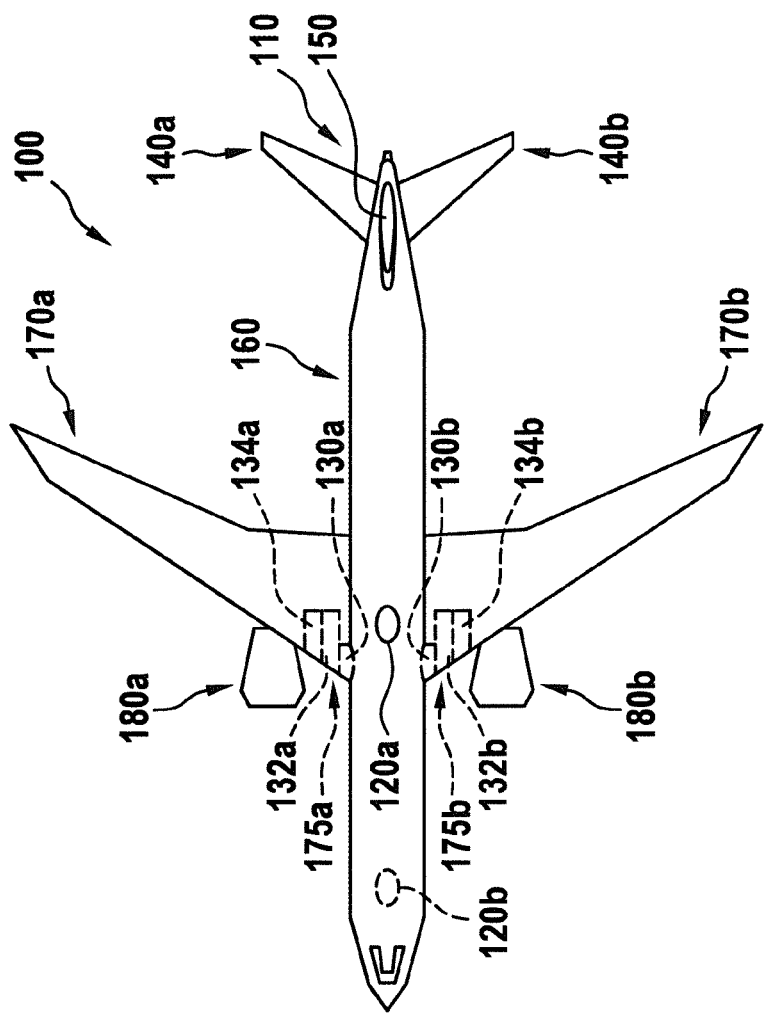
FIG. 1A depicts a schematic top view of an aircraft in accordance with an exemplary embodiment of the invention, wherein the aircraft is equipped with a plurality of aircraft headlights according to exemplary embodiments of the invention.
Figure 1B:
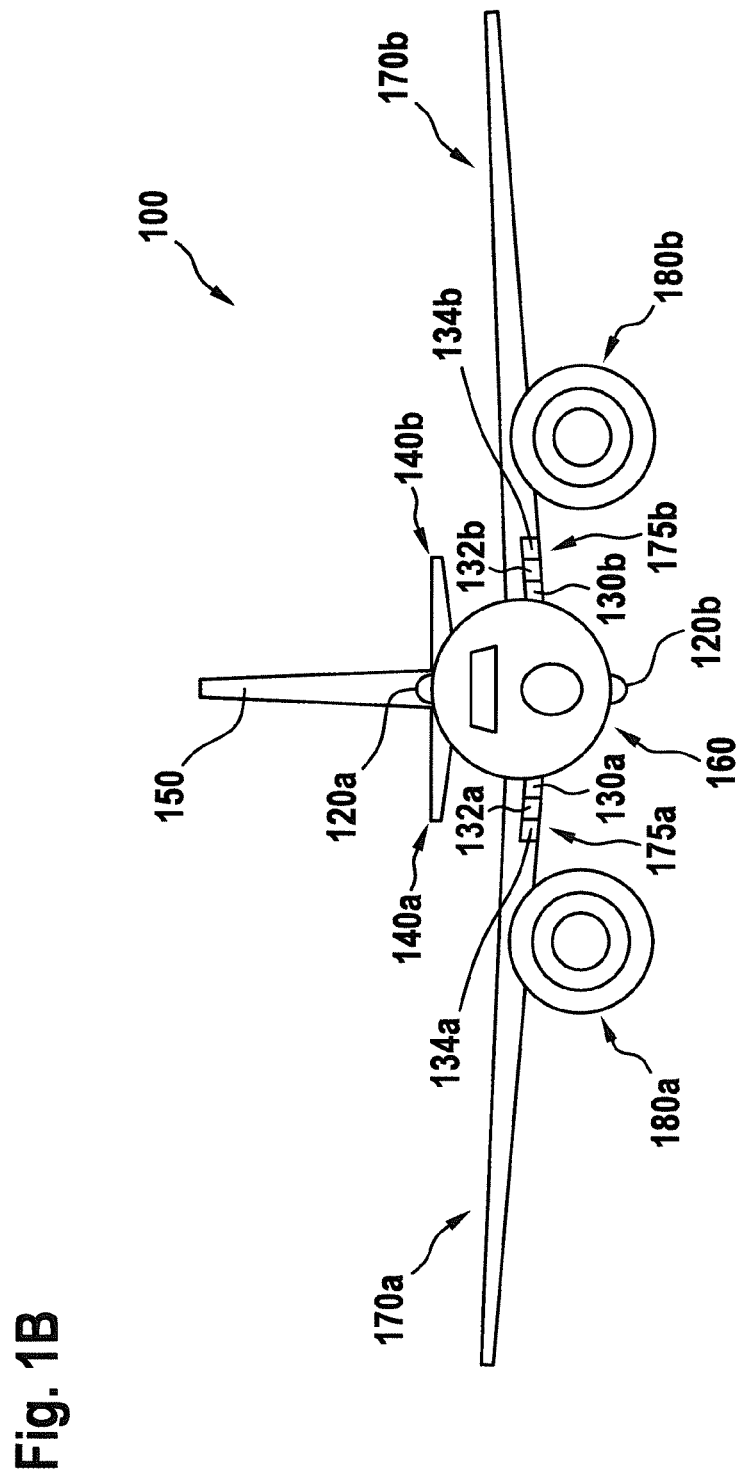
FIG. 1B shows a schematic front view of the aircraft shown in FIG. 1A, when in cruise flight.

FIG. 1A shows a schematic top view of an aircraft 100, in particular of a passenger airplane 100, from a position above the aircraft 100. The aircraft 100 is in accordance with an exemplary embodiment of the invention, having a plurality of aircraft headlights according to exemplary embodiments of the invention. FIG. 1B shows a schematic front view of the aircraft 100, which is depicted in FIG. 1A.

The aircraft 100 comprises a fuselage 160 and two wings 170a, 170b extending laterally from the fuselage 160. The wings 170a, 170b are joined with the fuselage 160 at the wing roots 175a, 175b of the aircraft 100. A respective engine 180a, 180b is attached to each of the wings 170a, 170b.

The aircraft 100 further comprises two horizontal stabilizers 140a, 140b and a vertical stabilizer 150, which are mounted to an aft section of the fuselage 160.

The aircraft 100 is equipped with a variety of exterior aircraft lights.

Out of the total set of exterior aircraft lights, which may be provided at the exterior of the aircraft 100, only two combined landing and take-off lights 130a, 130b, two taxi lights 132a, 132b, two runway turn-off lights 134a, 134b, and two red-flashing beacon lights 120a, 120b are depicted in FIGS. 1A and 1B.

The aircraft 100 may be equipped with additional exterior lights, which may in particular include at least one of navigation lights, logo lights, wing scan lights, engine scan lights, white strobe anti-collision lights and/or cargo loading lights. For clarity and simplicity of the illustration and description, these additional types of exterior aircraft lights are not depicted in FIGS. 1A and 1B.

In the exemplary embodiment depicted in FIGS. 1A and 1B, the combined landing and take-off lights 130a, 130b, the taxi lights 132a, 132b, and the runway turn-off lights 134a, 134b are located in the wing roots 175a, 175b of the aircraft 100. The wing roots 175a, 175b are those portions of the fuselage 160, to which the wings 170a, 170b are mounted. The wing roots 175a, 175 may also be seen as connecting portions between the fuselage 160 and the wings 170a, 170b.

Each of the combined landing and take-off lights 130a, 130b, the taxi lights 132a, 132b, and the runway turn-off lights 134a, 134b may be an aircraft headlight according to an exemplary embodiment of the invention, as it is described in the following with reference to FIGS. 2 to 6.

In further embodiments, which are not explicitly depicted in the figures, aircraft headlights 2 according to exemplary embodiments of the invention may be located in other portions of the wings 170a, 170b.

Figure 1C:
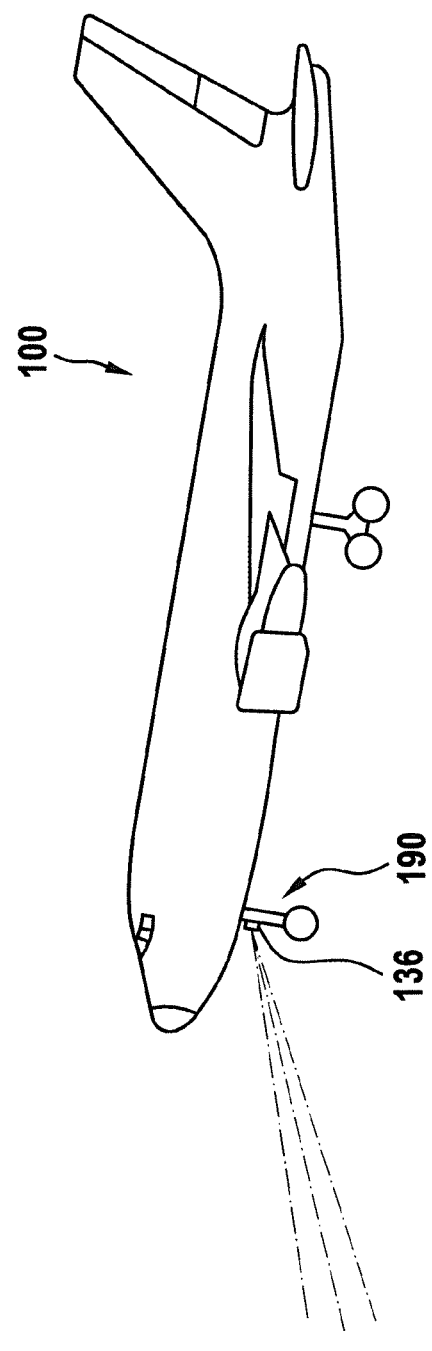
FIG. 1C shows a schematic side view of the aircraft shown in FIGS. 1A and 1B, when approaching an airport.

FIG. 1C shows a schematic side view of the aircraft 100, which is depicted in FIGS. 1A and 1B, during an approach to an airport. As depicted in FIG. 1C, the aircraft 100 further comprises an additional landing light 136, mounted to a front running gear/front landing gear 190 of the aircraft. The additional landing light 136 may also be an aircraft headlight in accordance with an exemplary embodiment of the invention.

Figure 2:
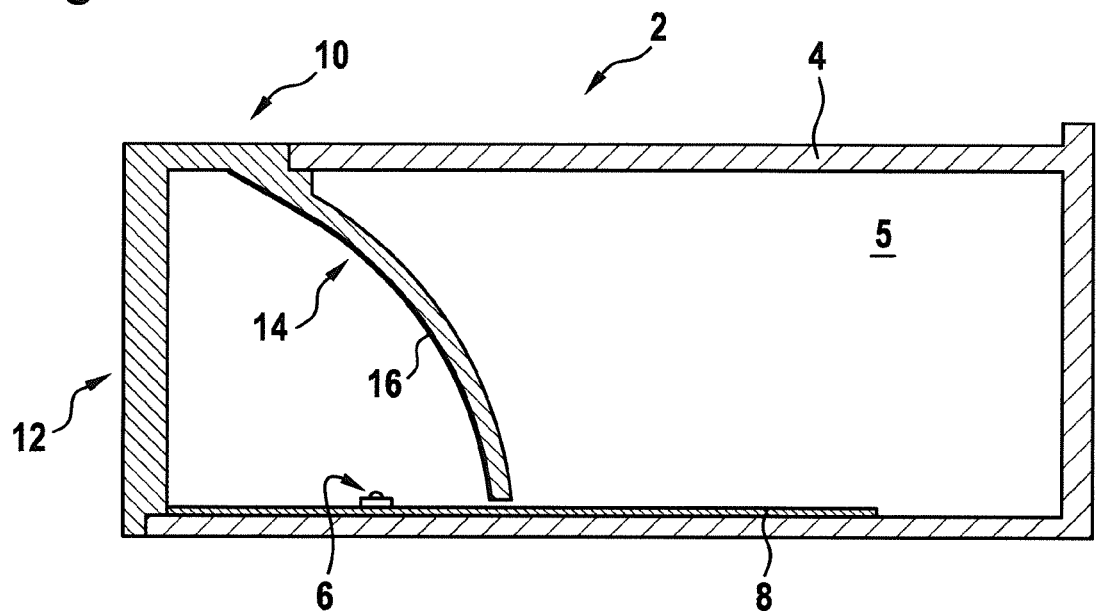
FIG. 2 depicts a schematic cross-sectional view of an aircraft headlight according to an exemplary embodiment of the invention.

FIG. 2 depicts a schematic cross-sectional view of an aircraft headlight 2 according to an exemplary embodiment of the invention.

The aircraft headlight 2 comprises a housing 4 defining an inner space 5 of the aircraft headlight 2. When the aircraft headlight 2 is mounted to an aircraft 100, the housing 4 may be accommodated in the fuselage 160 or in a wing 170a, 170b of the aircraft 100. It is also possible that the housing is mounted to a running gear/landing gear of the aircraft 100.

The aircraft headlight 2 further comprises at least one light source 6, for example at least one LED, which is supported by a support structure 8. The support structure 8 may include a circuit board, in particular a printed circuit board, which comprises electrically conductive paths for supplying electric energy to the at least one light source 6.

Figure 3:
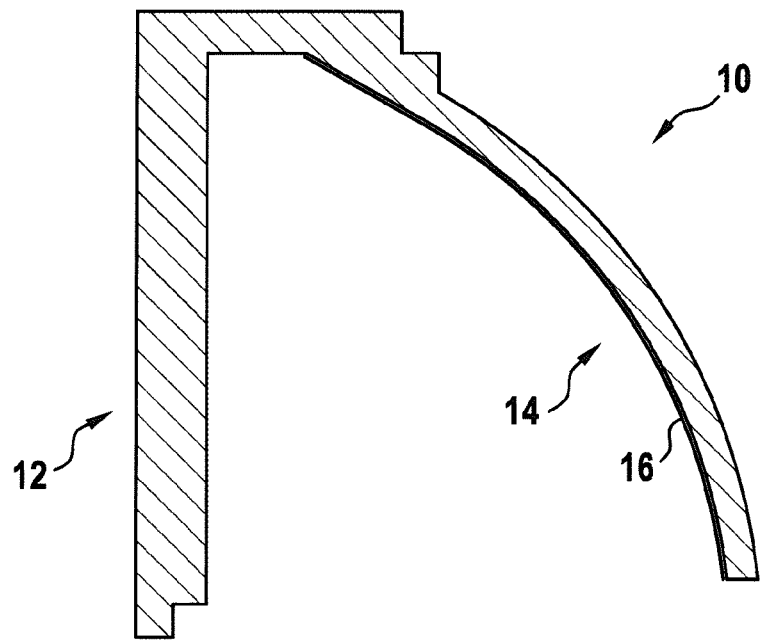
FIG. 3 depicts an enlarged cross-sectional view of an integrated, single-piece optical structure of an aircraft headlight according to an exemplary embodiment of the invention.

The aircraft headlight 2 further comprises an integrated, single-piece optical structure 10, which includes a light transmissive protective cover portion 12 and at least one reflector portion 14. FIG. 3 depicts an enlarged cross-sectional view of the integrated, single-piece optical structure 10.

In the cross-section depicted in FIGS. 2 and 3, the integrated, single-piece optical structure 10 has a u-shape or a v-shape, with the light transmissive protective cover portion 12 forming a first leg and the at least one reflector portion 14 forming a second leg of the u-shape or the v-shape.

The first leg, which is part of the light transmissive protective cover portion 12, is part of an outer light emission surface of the aircraft headlight 2. The light transmissive protective cover portion 12 may constitute a complete outer surface at at least one side of the housing 2, as it is depicted in FIG. 2.

The second leg, which is part of the at least one reflector portion 14, protrudes into an inner space of the housing 2.

The light transmissive protective cover portion 12 may be completely light transmissive. Alternatively, the light transmissive protective cover portion 12 may be partially light transmissive, i.e. the light transmissive protective cover portion 12 may include light transmissive areas and opaque areas.

The outer surface of the light transmissive protective cover portion 12 may be the outermost portion of the light emission surface of the aircraft headlight 2. The outer surface of the light transmissive protective cover portion 12 may also be coated with an outer coating. Also in this case, the light transmissive protective cover portion 12 is considered to constitute the outer light emission surface of the aircraft headlight 2.

The at least one reflector portion 14 is arranged and configured for directing light that is emitted by the at least one light source 6 through the light transmissive protective cover portion 12.

The at least one reflector portion 14 may have an at least partially spherical shape or an at least partially parabolic shape.

The integrated, single-piece optical structure 10 is integrally formed as a single piece, i.e. the light transmissive protective cover portion 12 and the at least one reflector portion 14 are produced in combination in the same process. In other words, the light transmissive protective cover portion 12 and the at least one reflector portion 14 are not produced separately and then joined in an additional joining step.

The integrated, single-piece optical structure 10 may by formed by molding, in particular by injection molding. The integrated, single-piece optical structure may be made from a polymer based material, in particular from a polycarbonate based material.

A reflective coating 16, in particular a metallic reflective coating, may be provided at the at least one reflector portion 14. The at least one reflector portion 14 may be partially or completely covered by the reflective coating 16.

In case the aircraft headlight 2 comprises a plurality of light sources 6, the aircraft headlight 2 may comprise a plurality of reflector portions 14, and a respective one of the reflector portions 14 may be assigned to each of the light sources 6.

Figure 4:
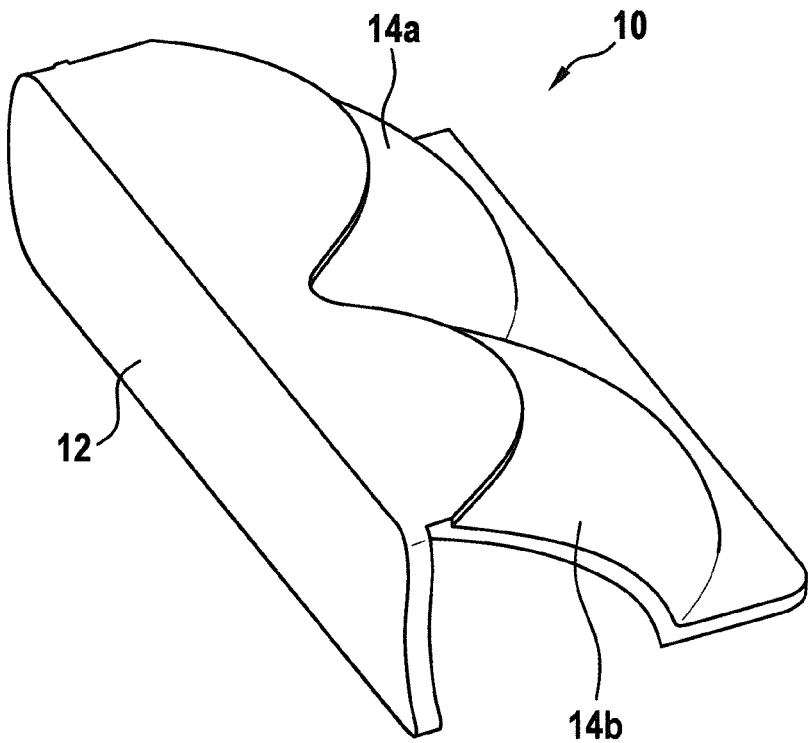
FIG. 4 depicts a perspective view of an integrated, single-piece optical structure of an aircraft headlight according to an exemplary embodiment of the invention, the integrated, single piece optical structure comprising a single light transmissive protective cover portion and two reflector portions.

FIG. 4 shows a perspective view of an integrated, single-piece optical structure 10, comprising a single light transmissive protective cover portion 12 with two reflector portions 14a, 14b. The integrated, single-piece optical structure 10 may be used in aircraft headlights in accordance with exemplary embodiments of the invention.

Figure 5:
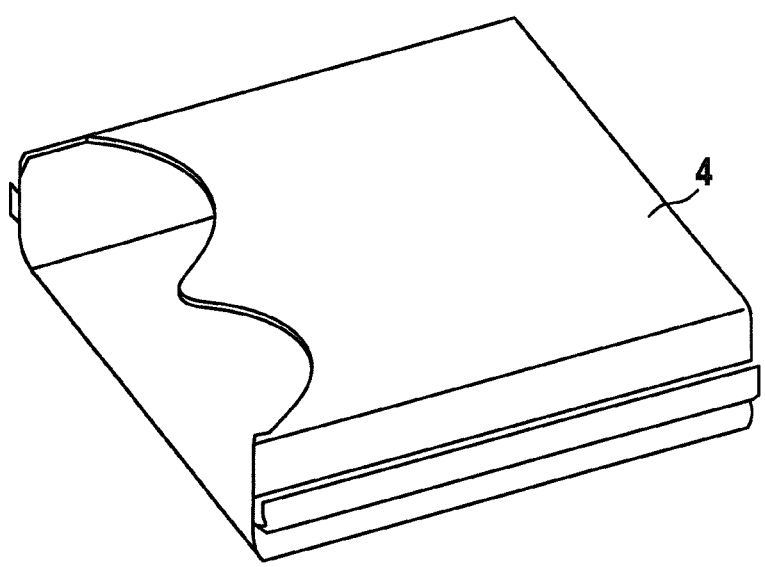
FIG. 5 depicts a perspective view of a housing, which is shaped to be combined with the single-piece optical structure depicted in FIG. 4.

FIG. 5 shows a perspective view of a housing 4, which is configured to cooperate with the integrated, single-piece optical structure 10 depicted in FIG. 4.

Figure 6A:
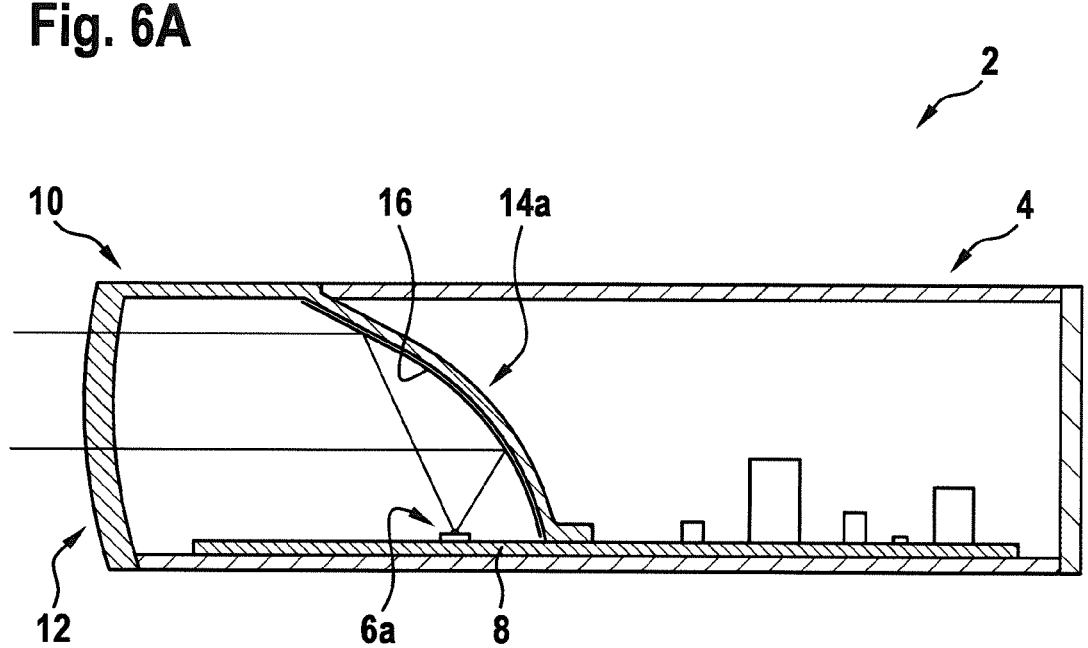
FIG. 6A depicts a first cross-sectional view of an aircraft headlight in accordance with an exemplary embodiment of the invention, comprising the integrated, single-piece optical structure depicted in FIG. 4 and the housing depicted in FIG. 5.

FIG. 6A shows a first cross-sectional view of an aircraft headlight 2 in accordance with an exemplary embodiment of the invention, comprising the single-piece optical structure depicted in FIG. 4 and the housing depicted in FIG. 5.

Figure 6B:
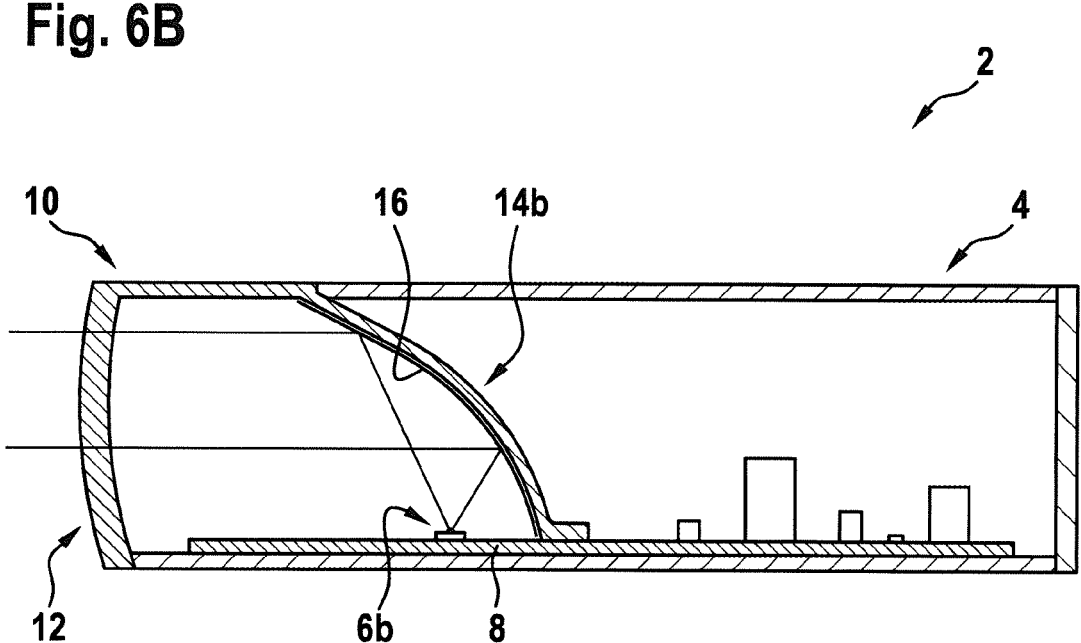
FIG. 6B depicts a second cross-sectional view of an aircraft headlight in accordance with an exemplary embodiment of the invention, comprising the integrated, single-piece optical structure depicted in FIG. 4 and the housing depicted in FIG. 5.

FIG. 6B shows a second cross-sectional view of an aircraft headlight 2 in accordance with an exemplary embodiment of the invention, comprising the single-piece optical structure depicted in FIG. 4 and the housing depicted in FIG. 5.

The cross-sectional planes of the cross-sectional views shown in FIGS. 6A and 6B extend parallel to each other and are orthogonal to the plane of the light transmissive protective cover portion 12.

The cross-sectional plane of the cross-sectional view shown in FIG. 6A extends through a first reflector portion 14a of the integrated, single-piece optical structure 10, and the cross-sectional plane of the cross-sectional view shown in FIG. 6B extends through a second reflector portion 14b of the integrated, single-piece optical structure 10.

Figure 7:
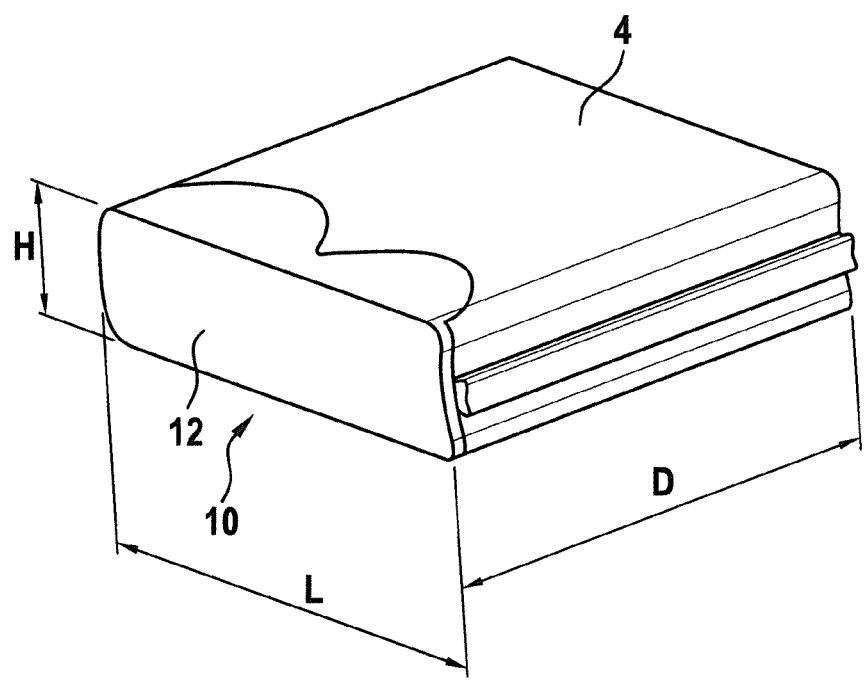
FIG. 7 depicts a perspective view of an aircraft headlight in accordance with an exemplary embodiment of the invention, comprising the integrated, single-piece optical structure depicted in FIG. 4 and the housing depicted in FIG. 5.

FIG. 7 shows a perspective view of the aircraft headlight 2 of FIGS. 6A and 6B.

In the exemplary embodiment depicted in FIGS. 4 to 7, the light transmissive protective cover portion 12 of the aircraft headlight 2 has a substantially rectangular shape. The substantially rectangular shape may include rounded edges.

The substantially rectangular shape of the light transmissive protective cover portion 12 may in particular have a lateral extension L of between 40 mm and 150 mm, more in particular a lateral extension of between 80 mm and 120 mm.

The substantially rectangular shape of the light transmissive protective cover portion 12 may in particular have a height extension H of between 20 mm and 50 mm, more in particular a height extension of between 25 mm and 40 mm.

The housing 4 may have a depth D of between 100 mm and 200 mm, more in particular a depth D of between 120 mm and 170 mm. The housing 4 may extend into the interior of the aircraft 100, in particular into the interior of a wing 170a, 170b of the aircraft 100, with its depth D, when the aircraft headlight 2 is mounted to the aircraft 100. It can also be said that the housing may extend a depth D into the skin of the aircraft 100. The aircraft 100 may have a corresponding slot for receiving the housing 4. It is also possible that the housing 4 is mounted to a running gear/landing gear of the aircraft 100.

The aircraft headlight 2, depicted in FIGS. 6A, 6B and 7, comprises at least two light sources 6a, 6b, with at least one light source being associated with each one of the two reflector portions 14a, 14b, respectively. Each of the two reflector portions 14a, 14b is arranged for directing light from the respectively associated at least one light source through the light transmissive protective cover portion 12 for providing one of two light outputs of the aircraft headlight 2.

The at least two light source 6a, 6b may be switchable independently of each other. In such a configuration, the aircraft headlight 2 may selectively emit a first light output by activating the at least one light source 6a that is associated with the first reflector portion 14a, may selectively emit a second light output by activating the at least one light source 6b that is associated with the second reflector portion 14b, and may selectively emit a third light output, which is a combination of the first and second light outputs, by simultaneously activating the at least one light source 6a that is associated with the first reflector portion 14a and the at least one light source 6b that is associated with the second reflector portion 14b.

The aircraft headlight 2 may for example, be a combined landing and take-off light, wherein the first light output is a landing light output and the second light output is a take-off light output.

In another exemplary embodiment, the aircraft headlight 2 may be a combined landing and taxi light, wherein the first light output is a landing light output and the second light output is a taxi light output.

In yet another exemplary embodiment, the aircraft headlight 2 may be a combined taxi and runway turn-off light, wherein the first light output is a taxi light output and the second light output is a runway turn-off light output.

In the exemplary embodiment of FIGS. 4 to 7, the aircraft headlight 2 has the form of a plug-in module, which may also be referred to as cassette or cartridge. Such a plug-in module may have very compact dimensions, may combine multiple lighting functions, and may be conveniently mounted to an aircraft in different locations, such as in the wings or in the wing roots or in the fuselage or at a running gear. While the compact implementation helps in all kinds of aircraft, it may be particularly welcome in smaller aircraft, such as recreational airplanes or private jets, or in unmanned aircraft.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft headlight, comprising:
at least one light source;
a housing accommodating the at least one light source; and
an integrated, single-piece optical structure, which includes:
a light transmissive protective cover portion, forming an outer light emission surface of the headlight, wherein the integrated, single-piece optical structure including the light transmissive protective cover portion closes the housing at least on one side thereof; and
at least one reflector portion, arranged for directing light that is emitted by the at least one light source through the light transmissive protective cover portion, wherein the at least one reflector portion protrudes into an inner space of the housing thereby positioning the at least one light source between the light transmissive protective cover portion and the at least one reflector portion,
wherein the integrated, single-piece optical structure substantially has a u-shape or a v-shape in at least one cross-section, with the light transmissive protective cover portion forming a first leg and the at least one reflector portion forming a second leg of the u-shape or the v-shape,
wherein the integrated, single-piece optical structure is an injection-molded structure and is made from a polymer based material, and
wherein a metallic reflective coating is provided at the at least one reflector portion.

2. The aircraft headlight according to claim 1,
wherein the light transmissive protective cover portion has a substantially rectangular shape,
wherein the substantially rectangular shape has a lateral extension (L) of between 40 mm and 150 mm, and
wherein the substantially rectangular shape has a height extension (H) of between 20 mm and 50 mm.

3. The aircraft headlight according to claim 1, wherein the at least one reflector portion has an at least partially spherical shape or an at least partially parabolic shape.

4. The aircraft headlight according to claim 1,
wherein the at least one light source comprises a plurality of light sources;
wherein the at least one reflector portion comprises a plurality of reflector portions;
and wherein each of the plurality of reflector portions is associated with one or more of the plurality of light sources and is arranged for directing light from the one or more light sources through the light transmissive protective cover portion.

5. The aircraft headlight according to claim 1, wherein the aircraft headlight is a landing light, a take-off light, a taxi light, a runway turn-off light, or a multi-functional light, which combines the functionalities of at least two of a landing light, a take-off light, a taxi light, and a runway turn-off light.

6. An aircraft, such as an airplane or a rotorcraft, comprising the at least one aircraft headlight according to claim 1, wherein the at least one aircraft headlight is installed in a wing of the aircraft or in a wing root of the aircraft or on a running gear of the aircraft.

7. A method of manufacturing an aircraft headlight, wherein the method comprises:

forming an integrated, single-piece optical structure, which includes:
a light transmissive protective cover portion; and
at least one reflector portion;

arranging at least one light source at at least one predefined position between the light transmissive protective cover portion and the at least one reflector portion with respect to the integrated, single-piece optical structure, such that the at least one reflector portion directs light emitted by the at least one light source through the light transmissive protective cover portion;

arranging the at least one light source in a housing;

arranging the integrated, single-piece optical structure in the aircraft headlight such that the light transmissive protective cover portion forms an outer light emission surface of the aircraft headlight; and arranging the integrated, single-piece optical structure to cooperate with the housing, wherein the integrated, single-piece optical structure closes the housing at least on one side thereof; and applying a metallic reflective coating to at the at least one reflector portion, wherein the integrated, single-piece optical structure substantially has a u-shape or a v-shape in at least one cross-section, with the light transmissive protective cover portion forming a first leg and the at least one reflector portion forming a second leg of the u-shape or the v-shape, and wherein the integrated, single-piece optical structure is formed by injection-molded structure and is made from a polymer based material.

8. The aircraft headlight according to claim 2, wherein the substantially rectangular shape has a lateral extension (L) of between 80 mm and 120 mm.

9. The aircraft headlight according to claim 2, wherein the substantially rectangular shape has a height extension (H) of between 25 mm and 40 mm.

10. The aircraft headlight according to claim 1, wherein the polymer based material is a polycarbonate based material.

* * * * *